US007187936B2

(12) United States Patent
Allyn et al.

(10) Patent No.: US 7,187,936 B2
(45) Date of Patent: Mar. 6, 2007

(54) WIRELESS TRACKING SYSTEM FOR PERSONAL ITEMS

(75) Inventors: James F. Allyn, Goldendale, WA (US); John D. Miller, Goldendale, WA (US); Sheng-Hui J. Chu, Nashua, NH (US)

(73) Assignee: J3 Keeper, L.L.C., Goldendale, WA (US)

( * ) Notice: Subject to any disclaimer, the term of this patent is extended or adjusted under 35 U.S.C. 154(b) by 181 days.

(21) Appl. No.: 11/025,865

(22) Filed: Dec. 21, 2004

(65) Prior Publication Data

US 2006/0135178 A1 Jun. 22, 2006

(51) Int. Cl.

*H04Q 7/20* (2006.01)
*H04Q 11/00* (2006.01)
*H04M 1/38* (2006.01)
*G08B 13/14* (2006.01)

(52) U.S. Cl. ................ 455/456.2; 455/421; 455/456.1; 455/566; 455/574; 340/568.1; 340/572.1

(58) Field of Classification Search .. 455/343.1–343.5, 455/150.1, 151.2, 181.1, 456.1–456.6, 557, 455/418, 566–567, 410–411, 414.1, 414.4, 455/420–421, 556.1, 556.2, 95, 457, 517, 455/550, 41.1–41.3, 100–101, 263, 574, 455/3.03, 68–71, 183.2, 186.1, 186.2, 227–129, 455/230–231, 350–355; 340/568.1, 571, 340/571.1, 572.2, 572.3, 572.4, 573.1, 7.32, 340/309.16; 370/310–311; 713/320–321
See application file for complete search history.

(56) References Cited

U.S. PATENT DOCUMENTS 4,178,549 A * 12/1979 Ledenback et al. ....... 325/38 R
4,952,913 A * 8/1990 Pauley et al. ............... 340/573
5,887,176 A * 3/1999 Griffith et al. .............. 395/750
6,282,407 B1 * 8/2001 Vega et al. .................... 455/41
6,344,794 B1 * 2/2002 Ulrich et al. ............... 340/539
6,894,600 B2 * 5/2005 Phelan ..................... 340/10.34
6,978,149 B1 * 12/2005 Morelli et al. .............. 455/522
7,009,495 B2 * 3/2006 Hughes et al. ............. 340/10.2
2003/0008692 A1 * 1/2003 Phelan ....................... 455/574
2005/0068168 A1 * 3/2005 Aupperle et al. ...... 340/539.13

* cited by examiner

*Primary Examiner*—Meless Zewdu
(74) *Attorney, Agent, or Firm*—Stratton Ballew PLLC

(57) ABSTRACT

A radio frequency transmission device including electronic circuitry. A digital logic circuit is alternate-able from a sleep mode to an active mode after a pre-determined time period, and back to the sleep mode immediately after transmission of a digital signal. The digital signal includes a unique and pre-determined sequence of fixed length pulses routed to a transmission circuit to transmit a radio signal in a specific frequency range. An output display signal from the output circuitry is displayed with an LED. An input circuitry is manually activated. A radio frequency signal is received with a receiver circuitry, sensed to determine if the received signal has a compatible characteristic of an expected signal. The radio frequency signal is converted into a digital form and sent to the microprocessor. Every associated transmitter device is tracked with a counter maintained by a microprocessor. Personnel, belongings and pets can be tracked with this device.

14 Claims, 16 Drawing Sheets

WIRELESS TRACKING SYSTEM FOR PERSONAL ITEMS

TECHNICAL FIELD

The invention relates to a method and apparatus for wireless tracking system, and more particularly to a wireless tracking system that employs a digital, low power radio frequency signal to track personal belongings, personnel and pets.

BACKGROUND OF THE INVENTION

As is known in the art of tracking personal items with wireless devices, some systems, such disclosed in U.S. Pat. No. 5,796,338, may be used to alert someone when his cellular phone is misplaced or been moved away from his possession. As shown in FIG. 1, a cellular phone 11 can be tracked by a pager 12, across a network 13, such as a "pager network" established and maintained by a third party service provider. In operation, this prior art alert utilizes the pager and the service provider's network to links a message transmission 14 from the cell phone device, and the cellular phone to the pager. The alert is sent by the user's cell phone to the pager, which is carried by the user to track their cell phone.

A fundamental problem with this prior alert system occurs if the pager 12 is misplaced, or if the user is in an area not covered by the network 13, or equivalent cellular phone network. The alert may fail to reach the user because of the possible delay in the delivery of alerting message from cellular phone 11 to the pager, preventing the user from a timely recovery of the valuable cellular phone. Additionally, this prior alert system may be rendered ineffective because the misplaced cellular phone must be manually operated, to trigger the sending of the message transmission 14 as the alerting signal. The timing of such a trigger is not guaranteed to occur soon enough to locate the cellular phone, nor is the trigger guaranteed to occur at all.

FIG. 2 shows another type of prior art system, sold as a "Now You Can Find It"®, by The Sharper Image Corp., of San Francisco, Calif., USA. This prior art system uses the transmission of radio frequency signal from a base device 20 to help someone locate items, to which a receiving device 21 are attached to. The receiving device is a radio frequency receiver, typically including at least a first disc 22 and a second disc 23. The first disc and the second disc are attached to items that are typically valuable and easily misplaced. The first disc and the second disc are independently capable of emitting a sounding alarm, when either receives a radio signal 24, at a pre-determined frequency from the base device. The base device is inactive most of the time. A failing of this prior alert system occurs if the receiving device disc is out of range and not able to receive the radio signal from base device. This scenario most likely occurs if someone walks away with the valuable item of interest, or if the receiving device is out of battery power, or receiving device's power source is otherwise disabled or disconnected. In practice, this scenario is very likely to happen, because the receiving device is inactive most of the time. It is very unlikely for the user to find out the "out-of-battery" condition prior to the item of interest being misplaced.

A wireless tracking device is needed that is able to overcome these shortcomings of prior devices. The present invention addresses these shortcomings and disadvantages, improving upon the design and operation of prior wireless tracking devices to provide a wireless tracking system that prevents "out of range" and "out of battery" failures. Furthermore, the present invention will be better understood by reference to the following detailed description taken in conjunction with the accompanying drawings.

DETAILED DESCRIPTION OF SPECIFIC EMBODIMENTS

The invention provides a wireless tracking system for personal belongings, including pets and can also include personnel. A preferred embodiment of the present invention, or "tracking system" 30, is shown in FIGS. 3 through 16. As detailed in FIGS. 3, and 4, the tracking system is most preferably, a set of at least two devices, as detailed herein, working together to help a user keep track of valuable personal belongings.

Figure 3:
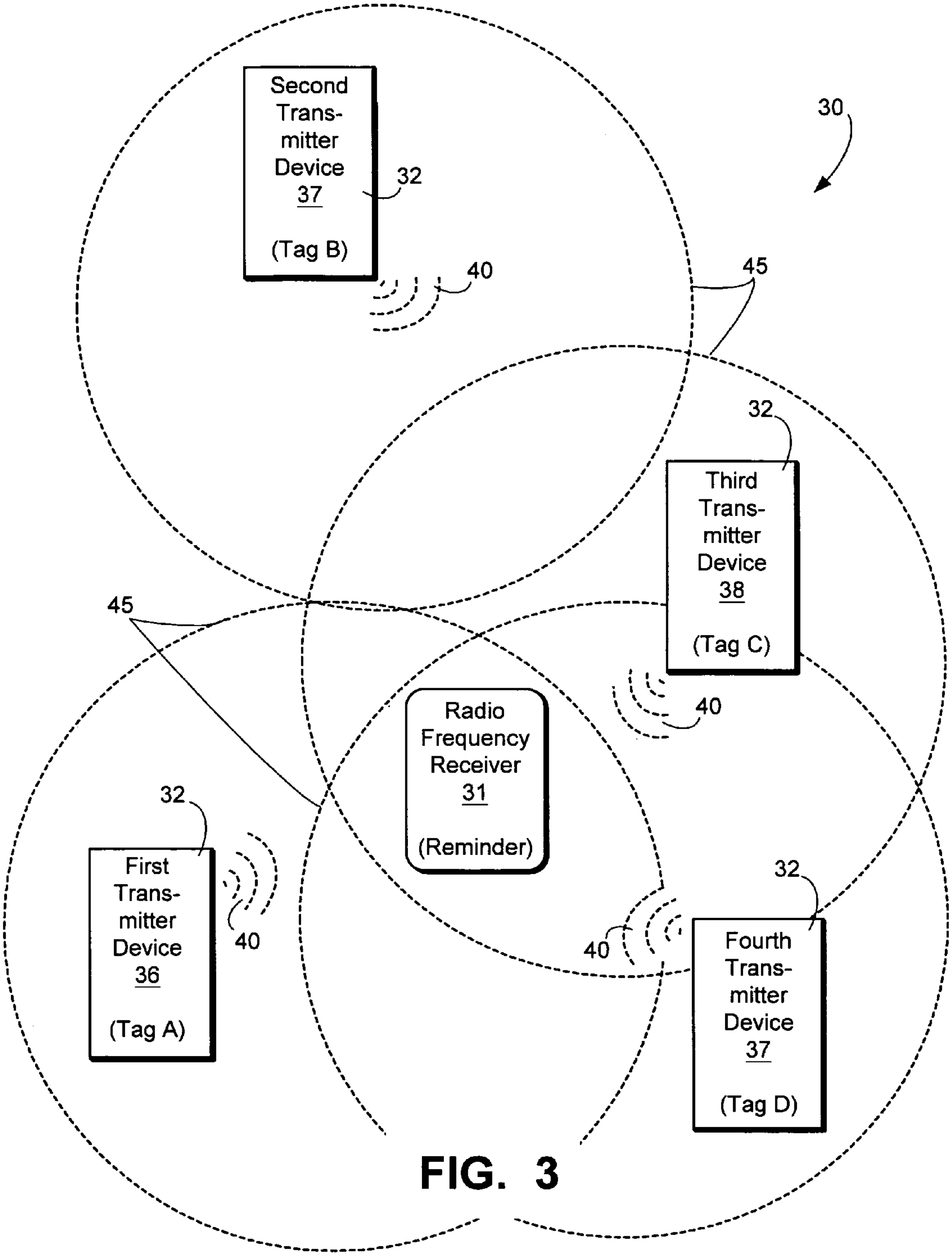
FIG. 3 is a schematic diagram of a tracking system, according to an embodiment of the invention.

FIG. 3 shows an overview of a preferred embodiment of the tracking system 30, according to the present invention. This preferred embodiment includes a radio frequency receiver 31, capable of tracking a radio transmitter 32. Up to sixteen radio transmitters may be independently tracked in this preferred embodiment, and for simplicity of description, only four radio transmitters are represented in FIG. 3, noted as a first transmitter device 36, a second transmitter device 37, a third transmitter device 38, and a fourth transmitter device 39.

There are two modes of operation for each radio transmitter 32. For example, as shown in FIG. 3, the second transmitter device 37, is in a "sleep mode" to conserve the power consumption in order to extend the usable life-time of a battery, embedded within. After a pre-determined time, each radio transmitter wakes up from the sleep mode into an "active mode," as illustrated by the third transmitter device 38 in FIG. 3, to send out a radio frequency signal 40. The radio frequency signal has a fixed duration, to efficiently inform the radio frequency receiver 31 that the third transmitter device is still "alive" or operational, and within a transmission range 45.

The radio frequency receiver 31 is most preferably a small, hand-held device, and may be referred to as a "reminder." The reminder is capable of keeping track of any "tagged devices" within its defined perimeter or range. Tagged devices are any devices to which the radio transmitter 32, have been attached, the "tag" being the radio transmitter. The tag can be smaller than the reminder, and is most preferably small, a coin-sized device, as further described later herein. The radio transmitter or tag, emits a radio frequency signal 40 that is very weak, with a unique digital identification sequence at a fixed interval, as also discussed further herein. The radio frequency signal is transmitted over a band that is open for non-restricted and unlicensed operation in the designated band-width.

The radio frequency signal 40 is so low in strength that it has little chance of interfering with the operation of other electronic devices. The tracking system preferably meets FCC Class B electromagnetic device emission standards, as well as applicable CE, ETSI, and CSA, UL 1950, US,EU, C-tick, S-Mark safety standards.

Figure 1:
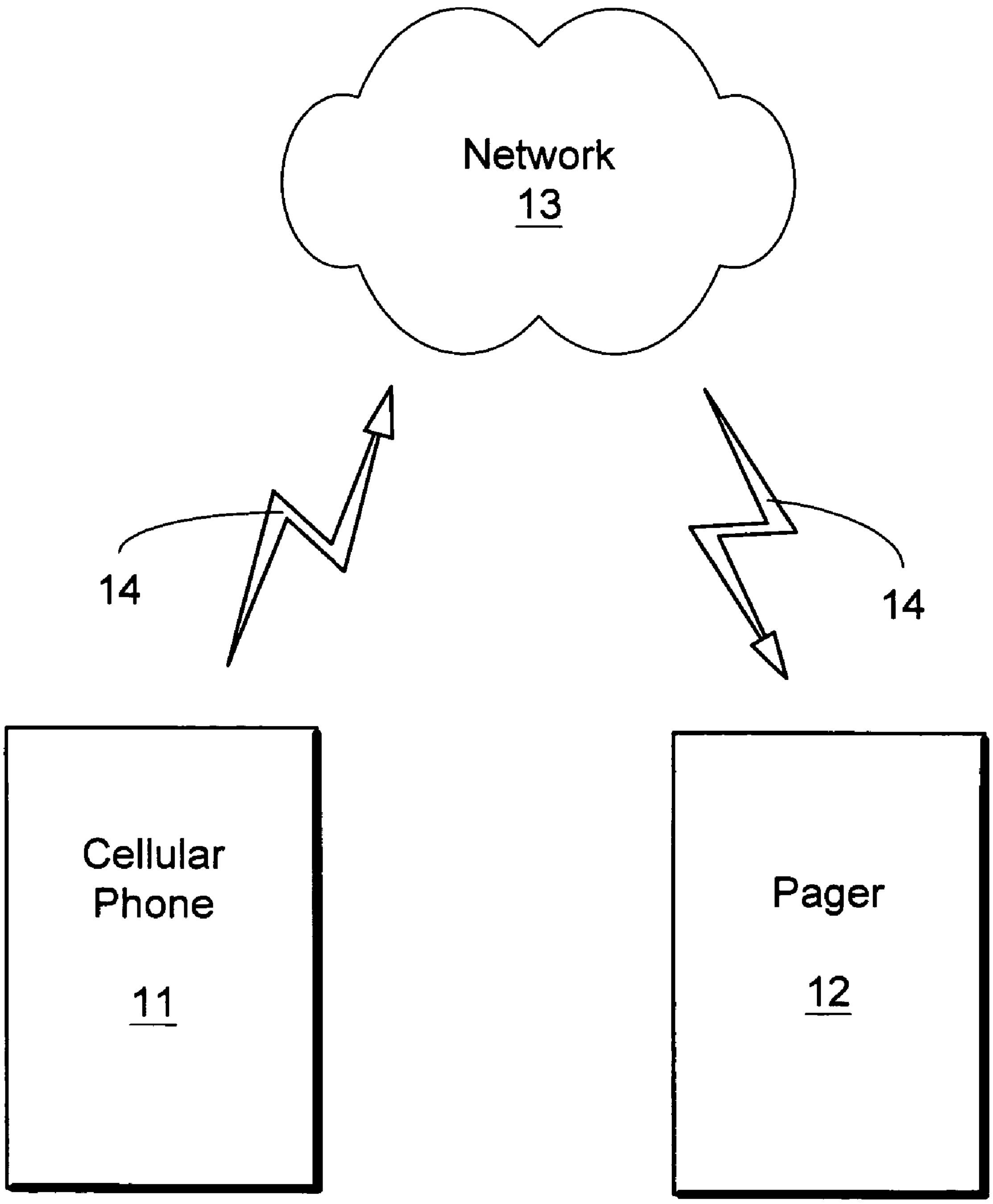
FIG. 1 (Prior Art)
FIG. 1 is a schematic diagram of a prior art tracking system.
Figure 2:
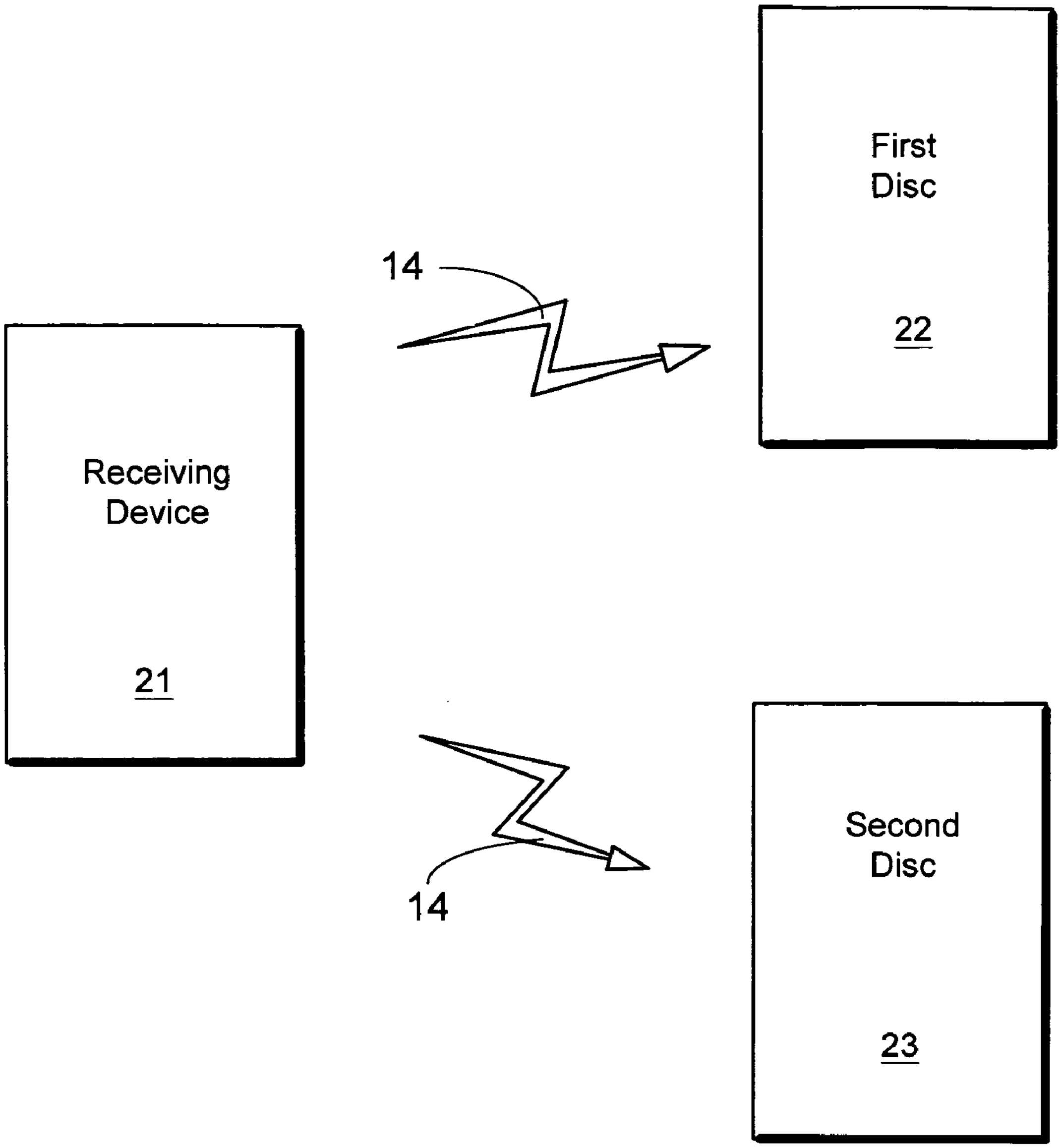
FIG. 2 (Prior Art)
FIG. 2 is a schematic diagram of a prior art tracking system.

A preferred embodiment of the tracking system 30, is shown in FIG. 3. When any one of the radio transmitters 32 is attached to, or alternatively incorporated within a valuable item, such as a cellular phone, the radio transmitter is always informed that the valuable item is within a reasonable distance. The present invention is that the tracking system 30 functions without depending on the operation of a third party service provider's network 13, as previously discussed herein and shown in prior art FIG. 1. The radio frequency receiver 31 is alerted when any of the radio transmitters runs out of battery power. The radio frequency receiver is also alerted as soon as any of the radio transmitters goes out of its radio range, and so provides an immediate signal to the owner of any object to which the radio transmitter is attached. Therefore, as compared to the prior art wireless tracking systems, the tracking system 30 of the present invention is much more effective in preventing someone from walking away with the owner's valuable item of interest.

Figure 5:
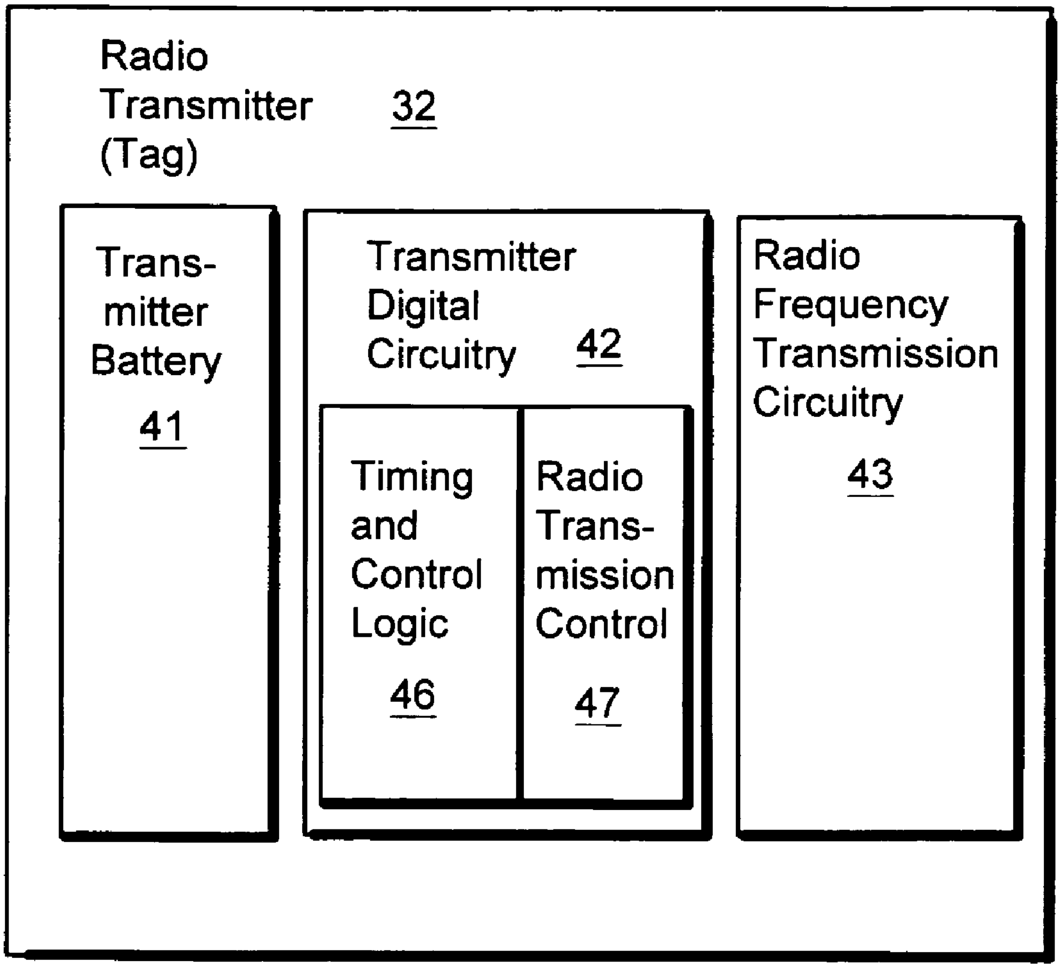
FIG. 5 is a schematic diagram of a tracking system, according to an embodiment of the invention.

FIG. 5 illustrates an exemplary implementation of an alerting feature of the tracking system 30 using the radio transmitter 32, according to the present invention. The radio transmitter includes a transmitter battery that supplies power to a transmitter digital circuitry 42 and a radio frequency transmission circuitry 43. The transmitter digital circuitry the radio frequency transmission circuitry is most preferably embedded within the radio transmitter. The transmitter digital circuitry includes a transmitter timing and control logic module 46, and a digital-to-analog conversion module 47. At every pre-determined interval, the transmitter timing and control logic module wakes up the digital-to-analog conversion module, and the radio frequency transmission circuitry from the sleep mode and into transmitting mode. The transmitter timing and control logic module sends a sequence of fixed-length digital data to digital-to-analog conversion module. The digital-to-analog conversion module receives the sequence of fixed-length digital data, converts the data into a sequence of code and sends them to the radio frequency transmission circuitry for transmission. After the data is sent, the transmitter timing and control logic module re-sets the digital-to-analog conversion module, and the radio frequency transmission circuitry back into the sleep mode.

Figure 6:
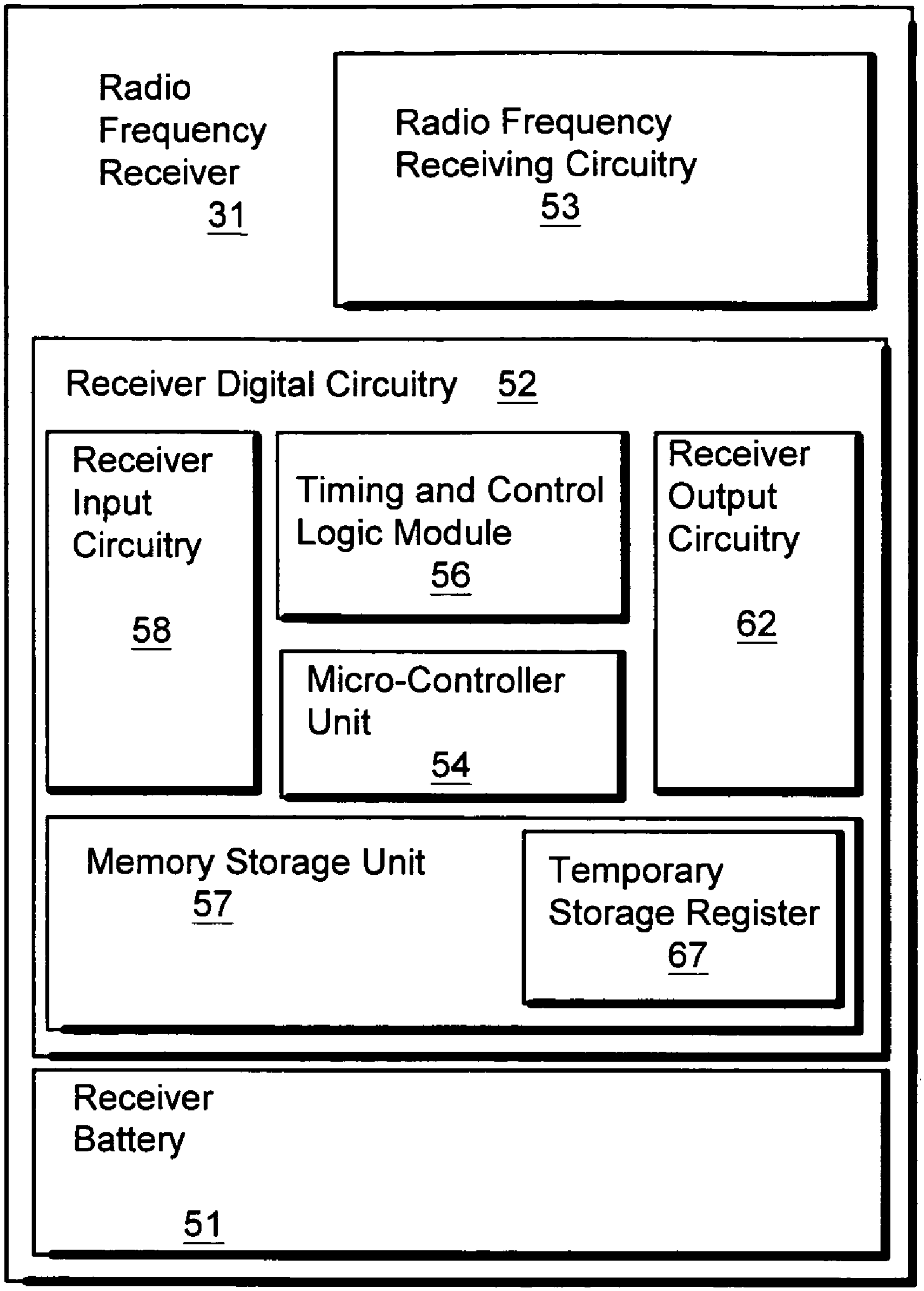
FIG. 6 is a schematic diagram of a tracking system, according to an embodiment of the invention.

FIG. 6 illustrates an exemplary implementation of the alerting feature of the tracking system 30 using the radio frequency receiver 31, according to a preferred embodiment of the present invention. The radio frequency receiver includes a receiver battery 51. The receiver battery supplies power to a receiver digital circuitry 52 and a radio frequency receiving circuitry 53, both embedded within the radio frequency receiver. The receiver digital circuitry includes a micro-controller unit 54 and a receiver timing and control logic module 56. The micro-controller unit has basic computing capabilities, and the receiver timing and control logic module provides miscellaneous timing, control and temporary storage units, as discussed later herein. A memory storage unit 57 stores the computing instruction and relevant data for the micro-controller unit. Additionally, a receiver input circuitry 58 supplies input information to the micro-controller unit.

Figure 4:
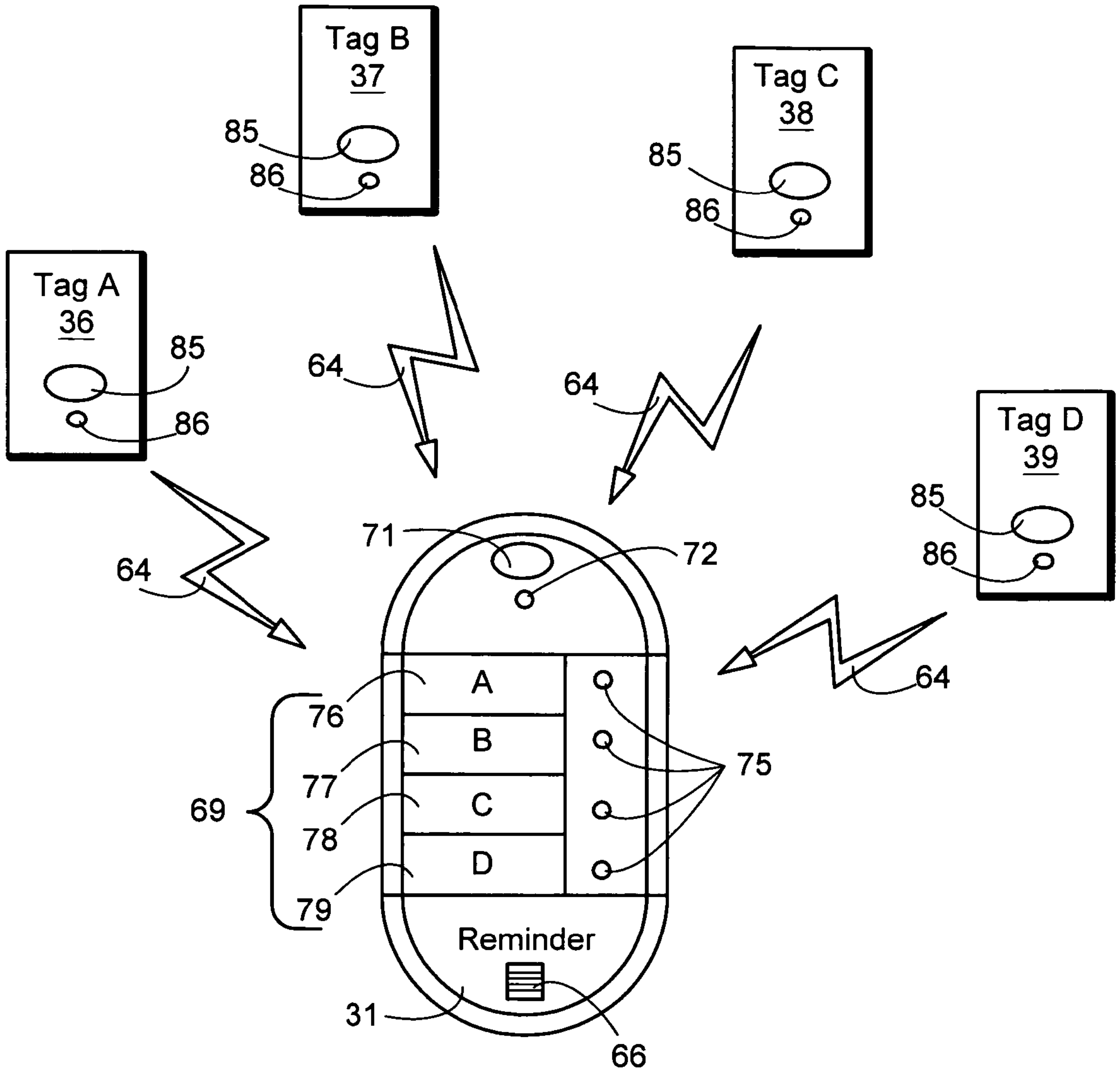
FIG. 4 is a schematic diagram of a tracking system, according to an embodiment of the invention.

A receiver output circuitry 62 receives commands from the receiver timing and control logic module 56, to produce an output signal 64, preferably an audible signal, to the user of the radio frequency receiver 31, or reminder, as shown in FIG. 4. A reminder speaker 66 is most preferably utilized to emit the output signal. However, as an alternative, a light-emitting device, such as an LED could be employed in addition to or instead of the reminder speaker. When the radio frequency receiving circuitry 53 of the reminder receives a radio signal 14, presumably transmitted from one of the radio transmitters 32, the radio frequency receiver translates the received radio signal into a digital data stream, as further discussed herein. This translation is accomplished with the receiver input circuitry 58 of the receiver digital circuitry 52. The digital data stream is then sent to a temporary storage register 67 within the memory storage unit 57.

The radio frequency signal 40 is typically a "packet" or group signals closely spaced in time. For every pre-determined period of time, the timing and control logic module 56 sends a control signal to the micro-controller unit 54 to wake it up from sleep mode, into operation mode. The micro-controller unit then checks the temporary storage register 67 in the memory storage unit 57, to determine if there is any digital data received, and further if the received digital data is from any of the transmitter devices 32. The micro-controller unit then checks the receiver input circuitry 58 to determine if user has pressed a reminder control button 69. The micro-controller unit then processes the input data and processes the user's selection of a reminder control button and determines if there is any output data to be sent to the receiver output circuitry 62.

As further shown in FIG. 4, the reminder 31,or radio frequency receiver, preferably includes a master power button 71, and a power LED 72. The power LED is preferably a conventional "light emitting diode." Like all LED devices employed in the present invention, the power LED is of a typical design and construction, well known to those skilled in the manufacture and use of such devices. The master power button is designed and positioned on the reminder as detailed in FIG. 4. The master power button turns the reminder on or off, preferably by pushing the button for approximately one second. Most preferably, the master power button also acts to reset the operation of the reminder to default settings by pushing the button for more than approximately four seconds. This reset clears the registry of tags 32, and then re-establishes the registry.

The dimensions of the reminder 31 are preferably approximately one inch by two inches, and are one-quarter of an inch in depth. These approximate measurements are illustrative of the preferred dimensions of the reminder. Any appropriate dimension, as constrained by the size of the internal components, may be utilized. Additionally, the term "approximately" is employed herein throughout, including this detailed description and the attached claims, with the understanding that it denotes a level of exactitude commensurate with the skill and precision typical for the particular field of endeavor, as applicable. The transmitter battery 41 within the reminder is preferably a standard "CR2016" replaceable, three-Volt lithium or alkaline power cell. The alkaline battery has an expected approximate life of one month in the reminder. Storage space for a spare battery is also preferably included in the reminder.

For the preferred embodiment shown in FIG. 4, which is similar to the embodiment of FIG. 3, four of the "tags" or radio transmitters 32 are employed with the reminder 31. Therefore, the reminder preferably includes four reminder control buttons 69, each with an indicator LED 75. In a most preferred embodiment, the reminder control button acts to either enable or disable the tag, by pushing the corresponding reminder control button for approximately one second. Most preferably, the reminder control buttons are each positioned on the reminder as shown in FIG. 4.

As shown in FIG. 4, for a preferred embodiment of the reminder control buttons 69, the indicator LED's 75 are positioned near to corresponding reminder control buttons 69. The indicator LED's are used to indicate the operational status of the reminder 31.

In a preferred embodiment of the tracking system 30, the indicator LED's 75 of the reminder 31 slowly blink, once every second, to indicate normal operation, and that the is particular tag 32 is within the transmission range 45 of the reminder. The indicator LED's switch to fast blinking at twice every second to indicate an "alert mode" in that the particular tag is out of transmission range. If one of the indicator LED's stays on, this preferably indicates that particular tag is in "setup mode," and that the reminder is trying to find and register the tag.

As also shown in FIG. 4, for a preferred embodiment of the reminder control buttons 69, an "A" button 76 preferably corresponds to the "tag A" 36, a "B" button 77 preferably corresponds to the "tag B" 37, a "C" button 78 preferably corresponds to the "tag C" 38, and a "D" button 79 preferably corresponds to the "tag D" 39. Most preferably, by pushing any particular control button for more than approximately four seconds, resets the tag 32 to default operational values.

The radio transmitters 32 or "tags," also preferably includes a tag check button 85, which is preferably positioned at the edge of each tag, for checking the remaining battery power of the tag. A tag status LED 86, as shown in FIG. 4, will turn on when the user pushes the tag check button, so indicating to the user that the transmitter battery 41 within the tag is operational. The tag status LED indicates the operational status of the tag device. Preferably, when pushing the check button, the tag status LED will turn on, indicating that the tag device is in normal operation. If the tag status LED does not light up, the transmitter battery 41 within the tag, is likely dead, and so the tag must be replaced.

Again, as shown in FIG. 3, the reminder 31 is preferably capable of tracking the presence of four tags 32 in the surrounding area within a set transmission range 45 of each tag. Each tag indicates normal operation by the slow blinking of its corresponding indicator LED 75. If the reminder detects that it is outside one of the tag's transmission range's, the reminder notifies the user by a emitting an output signal 64, which is preferably a beeping sound and indicates the missing tag by fast blinking the corresponding indicator LED. The user can selectively turn on or off monitoring any of the four tags, by deactivating that tags corresponding control button on the reminder. When the monitoring for a particular tag is turned off, the corresponding indicator LED will stop blinking and remain off.

The dimensions of each tag 32 are preferably the size of a typical coin: approximately one inch in diameter, and each are approximately one-eighth of an inch in thickness. Any appropriate dimension, as constrained by the size of the internal components, may be utilized. The transmitter battery 41 within each tag is preferably a standard "CR2012" non-replaceable, three-Volt lithium or alkaline power cell. The alkaline battery has an expected approximate life of two years within each tag. The tags and the reminder 31 can function over a wide range of temperature and humidity.

The reminder 31 and its associated tags 32 all include radio signal transmission capabilities. Preferably, the radio transmissions preferably operate in the band range of 33.72 MHz to 434.12 MHz, which is an unlicensed and non-restrictive band. The peak radio frequency output power level is approximately 0 dBm, and the modulation method is the industry standard "OOK," or On Off Keyed. A preferred data transmission rate for the reminder and the tags is 10 Kbps. The major components and external interfaces of reminder 31 for the tracking system 30 include a host processor, a receiver radio, and a transmitter radio. The host processor is preferably a single-chip, extremely low power, 8-bit micro-controller central processing unit that provides a UART interface to a RFM RX5000 radio transmitter. This micro-controller receives serial data from the radio receiver, performs inbound decoding, and updates the presence database and "go back to" loop. A flash memory of 4K Byte is preferred, along with a SD RAM sized at 64K Byte.

The radio frequency receiver 53 is most preferably a "RF Monolithic" model "RX5000," as manufactured by RF Monolithics, Inc. of Dallas, Tex., USA. The RX5000 is a low cost, short-range wireless control and data communication device. The radio frequency receiver receives a radio signal, and sends it through a serial interface to the host micro-controller unit 54, or processor, for processing.

The radio frequency transmission circuitry 43 of each tag 32 is most preferably a "RF Monolithic" model "TX5000," also manufactured by Peregrine RF Monolithics, Inc. of Dallas, Tex., USA. The TX5000 is a low cost, low power consumption, short-range wireless control and data communication device. The tag's radio frequency transmission circuitry, or transmitter, translates digital data, as generated by the radio transmission control 47 through a standard serial interface to the radio frequency transmission circuitry, which transmits the data as the radio frequency signal 40.

Each of the tags 32 most preferably bears a unique identification number registered within its transmitter digital circuitry 42, and emits the radio frequency signal 40 that carries the encoded identification in a fix time interval. The radio frequency signal is a sequence of fixed length pulses, which comprises a digital signal that uniquely identifies the particular tag among all other similar tags and other radio frequency transmission devices in general. Specifically, the sequence of fixed length pulses digital signal is distinguishable from a radio frequency transmission from another radio emitting device, the other radio emitting device able to transmit radio signals in the same frequency range as said radio transmission circuit of the radio frequency transmission device.

The tracking system 30 of the present invention preferably employs a standard "GPIO," which is the general purpose input/output interface for peripheral device interface. GPIO's provide broadly configurable data senses and handshaking methods. Additionally, GPIO provides the reminder 31 with the ability to efficiently and reliably wait for the radio frequency signal 40 from each tag 32, with a minimum of errors.

The micro-controller unit 54 of reminder 31 polls the serial interface of the RX5000 circuit, which again, is a preferable radio frequency receiver 53, to determine if there is any data coming from the radio receiving radio circuitry 53. If the radio frequency signal 40 is established as coming from a tag 32 under monitoring by the receiver input circuitry 58, the timing and control logic module 56 resets its presence counter.

Additionally, the GPIO is regularly scanned by the timing and control logic module 56 to detect button action, with the corresponding LED outputs, as discussed above, directed through the GPIO. Specifically, the micro-controller unit 54 scans the GPIO port to detect if the user has pressed the master power button 71, or any of the reminder control buttons 69. The micro-controller unit then processes the button-press event if such action is detected. The micro-controller also sends the LED status to a GPIO port to update the monitoring status.

Figure 7:
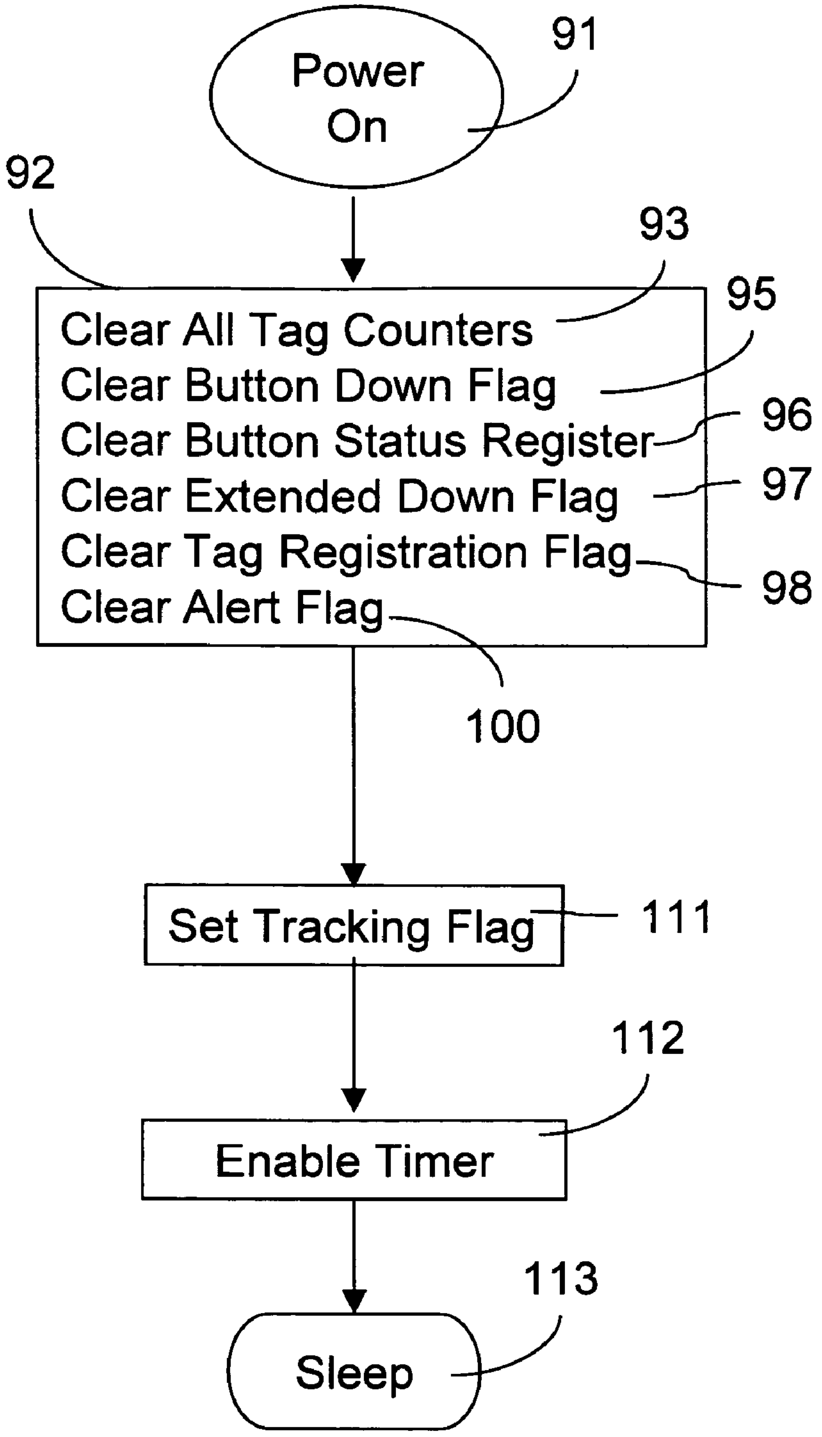
FIG. 7 is a logic flow diagram of a portion of a tracking system, according to an embodiment of the invention.

The software resident in the timing and control logic module 56 of the reminder 31, first initializes the reminder and waits for a radio frequency signal 40 from the tag 32. A preferred power-up sequence of the timing and control logic module, is shown in flowchart form in FIG. 7. An initialization routine 92 resets the radio frequency receiver 53, which is preferably the RX5000 circuit, and timer, while clearing the device registry of the specific Tag, resetting the device presence counter, and then entering the main processing loop of the receiver timing and control module 56. As shown in FIG. 7, this is most preferably accomplished by first Powering On 91 the reminder and then stepwise performing the initializations. The initializations include the clearing of all Tag Counters 93, clearing the Button Down Flag 95, clearing the Button Status Register 96, clearing the Extended Down Flag 97, clearing the Tag Registration Flag 98, and clearing the Alert Flag 100. After the initializations, the Tracking flag is set 111, and the Timer is enabled 112. The initialization of the timing and control logic module then enters a Sleep 113, or "sleep state," by default. As a preferred alternative, a standard "ISR implementation" may be also utilized with the power-up sequence.

Figure 8:
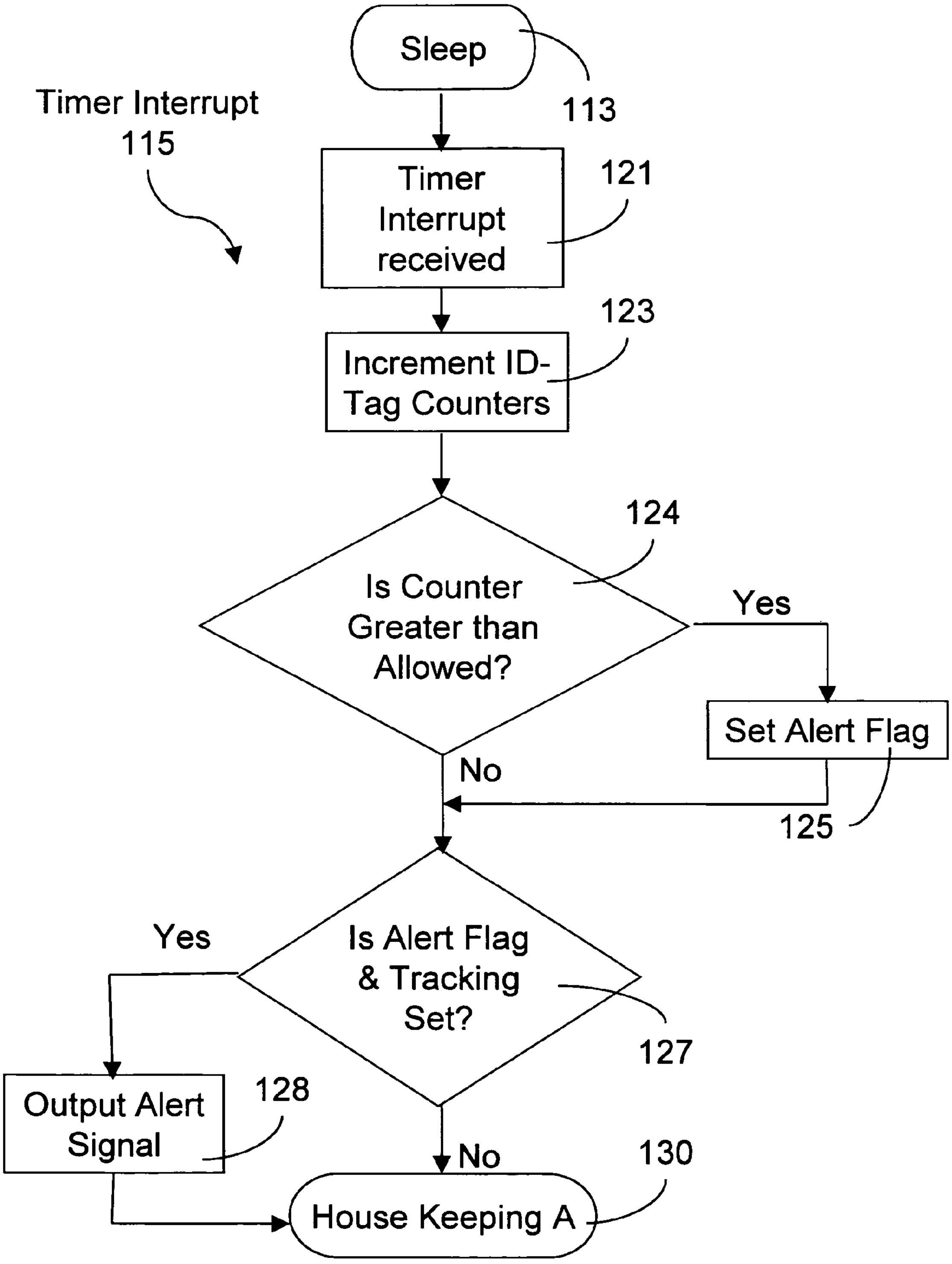
FIG. 8 is a logic flow diagram of a portion of a tracking system, according to an embodiment of the invention.
Figure 9:
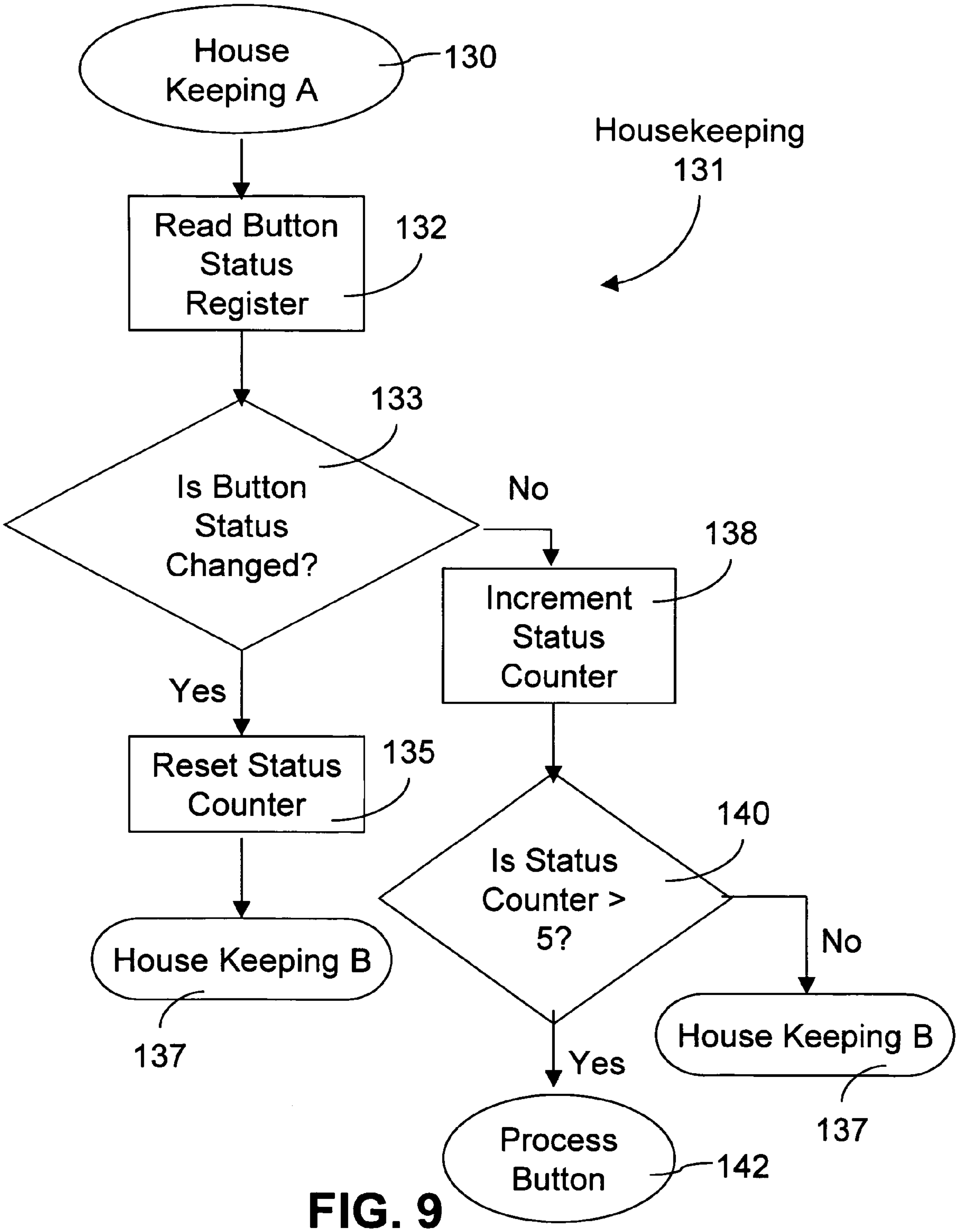
FIG. 9 is a logic flow diagram of a portion of a tracking system, according to an embodiment of the invention.

The micro-controller unit then enters an alert state, in which an Output Alert Signal 128 is generated, as shown in FIG. 8, if any of the device presence counters exceed a preset upper limit. Preferably, the digital data of the radio frequency signal 40 is encoded into 12-bits per 8-bits of raw data. The digital data is encoded according to TABLE 1, below:

TABLE 1

| Radio Symbol | Digital Data | Radio Symbol | Digital Data |
|---|---|---|---|
| 000111 | 0000 | 100110 | 1000 |
| 001011 | 0001 | 101001 | 1001 |
| 001101 | 0010 | 101010 | 1010 |
| 001110 | 0011 | 101100 | 1011 |

TABLE 1-continued

| Radio Symbol | Digital Data | Radio Symbol | Digital Data |
|---|---|---|---|
| 010110 | 0100 | 110001 | 1100 |
| 011001 | 0101 | 110010 | 1101 |
| 011010 | 0110 | 110100 | 1110 |
| 011100 | 0111 | 111000 | 1111 |

As shown in FIG. 8, in a timer interrupt processing 115, the micro-controller unit 54 of the timing and control logic module 56 increments the Presence Counters 116 of each Tag 32 under monitoring. The timer interrupt processing leaves sleep mode when a Timer Interrupt is received 121. The receipt of the Timer Interrupt serves to increment the ID-Tag Counters 123. The logic of the timer interrupt processing checks if the Counter is greater than allowed 124. If the Counter is greater than allowed, an alert Flag is set 125. After the Alert Flag is set, or if the Counter is not greater than allowed, the next decision module of the timer interrupt processing is entered, which is to check if the Alert Flag and Tracking are set 127.

If the Alert Flag and Tracking are set 127, the Output Alert Signal is generated 128. If Alert Flag and Tracking are not set or if no Alert Flag and Tracking are set, the timer interrupt processing 115 of the timing and control logic module 56 enters a "Housekeeping A" 130, as shown in FIG. 8, and proceeding to FIG. 9. In Housekeeping A, a housekeeping function 131 is called, first by a reading of the Button Status Register 132, followed by an check whether the Button Status has changed 133. If the Button Status has changed, a reset to a zero or null value of the Status Counter 135 is performed. After reset of the Status Counter, the housekeeping function continues to a "Housekeeping B" 137. If the Button Status has not changed, an Increment Status Counter is performed, in which the Status Counter is increased in value by one integer value. Then, the Status Counter is checked to see if is greater than five 140. If the Status Counter is greater than five, a Process Button 142 function or sub routine is called. If the Status Counter is not greater than five, the housekeeping function also proceeds to Housekeeping B.

Figure 10:
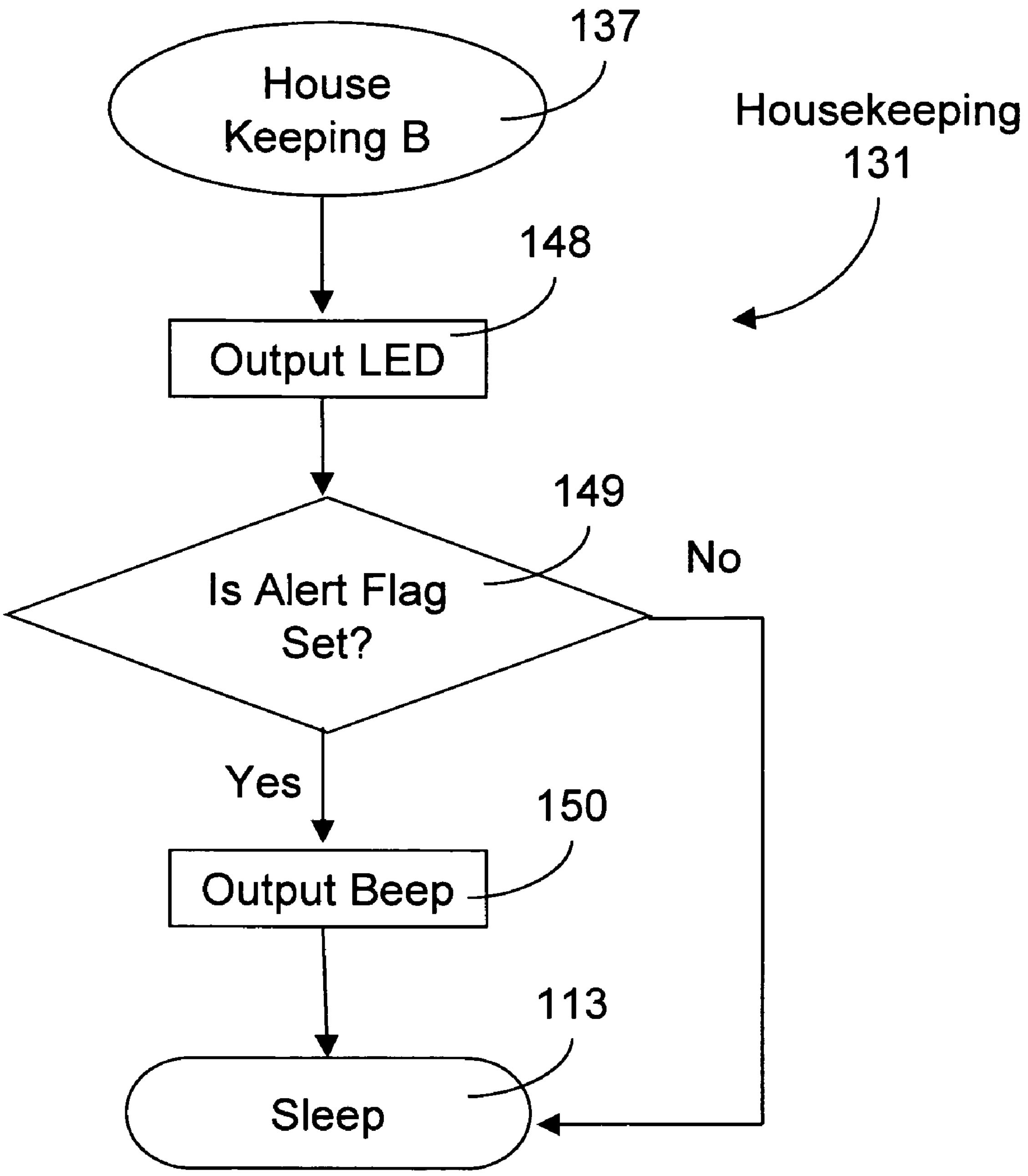
FIG. 10 is a logic flow diagram of a portion of a tracking system, according to an embodiment of the invention.
Figure 11:
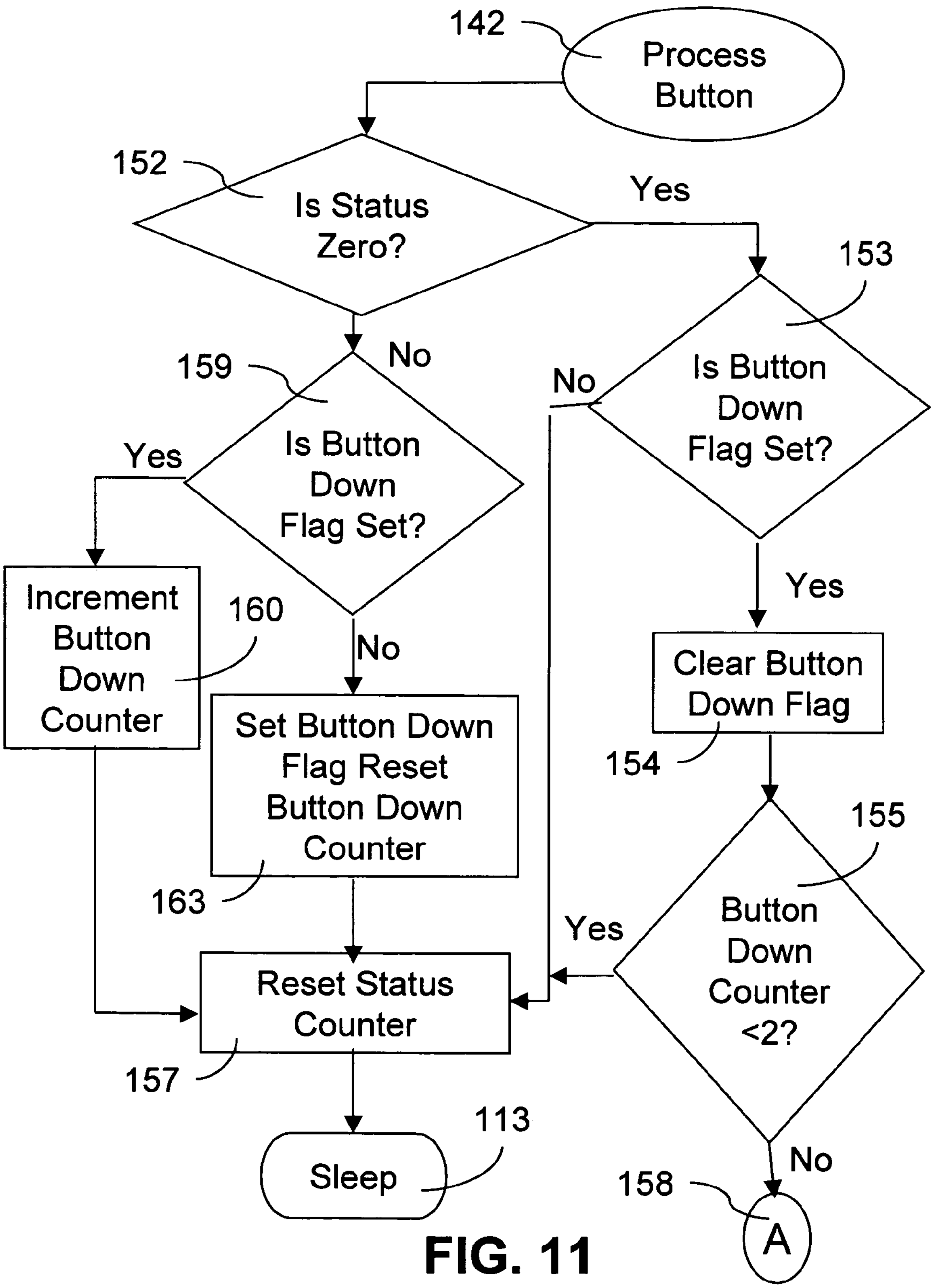
FIG. 11 is a logic flow diagram of a portion of a tracking system, according to an embodiment of the invention.

Housekeeping B 137, of the housekeeping function 131, is shown in FIG. 10, where an Output LED 148 is activated. Next, a check is performed to verify that an Alert Flag is set 149. If the Alert Flag has been set, an Output Beep 150 is also activated. The housekeeping function then again enters the Sleep 113 or sleep state. Likewise, if the Alert Flag is not set, the sleep state is also entered.

The Process Button 142 is a routine or function that first includes a check of the "status" as zero 152, the status being the button status. If the button status is zero the function then checks if the Button Down Flag is set 153. If the Button Down Flag is set, a clearing of the Button Down flag 154 is performed. Then, if the Button Down Counter is less than two 155, a reset of the Status Counter 157 is performed. If the Button Down Counter is two or greater, the Process Button function follows "A" 158 to FIG. 12, as discussed later herein.

If the check of the Status as zero 152 finds that the button status is not zero, the function checks if the Button Down Flag is set 159. In this instance, if the Button Down Flag is set, an incremental increase in the Button Down Counter 160 is executed, after which the reset of the Status Counter 157 is also performed.

If the Button Down Flag set 159 returns as false, a Button Down Flag is "set" or activated to a "true" setting, and a Button Down Counter is reset 163, or "zeroed." In any case, after the reset of the Status Counter, the function of the Process Button 142 enters the Sleep 113 mode.

Figure 12:
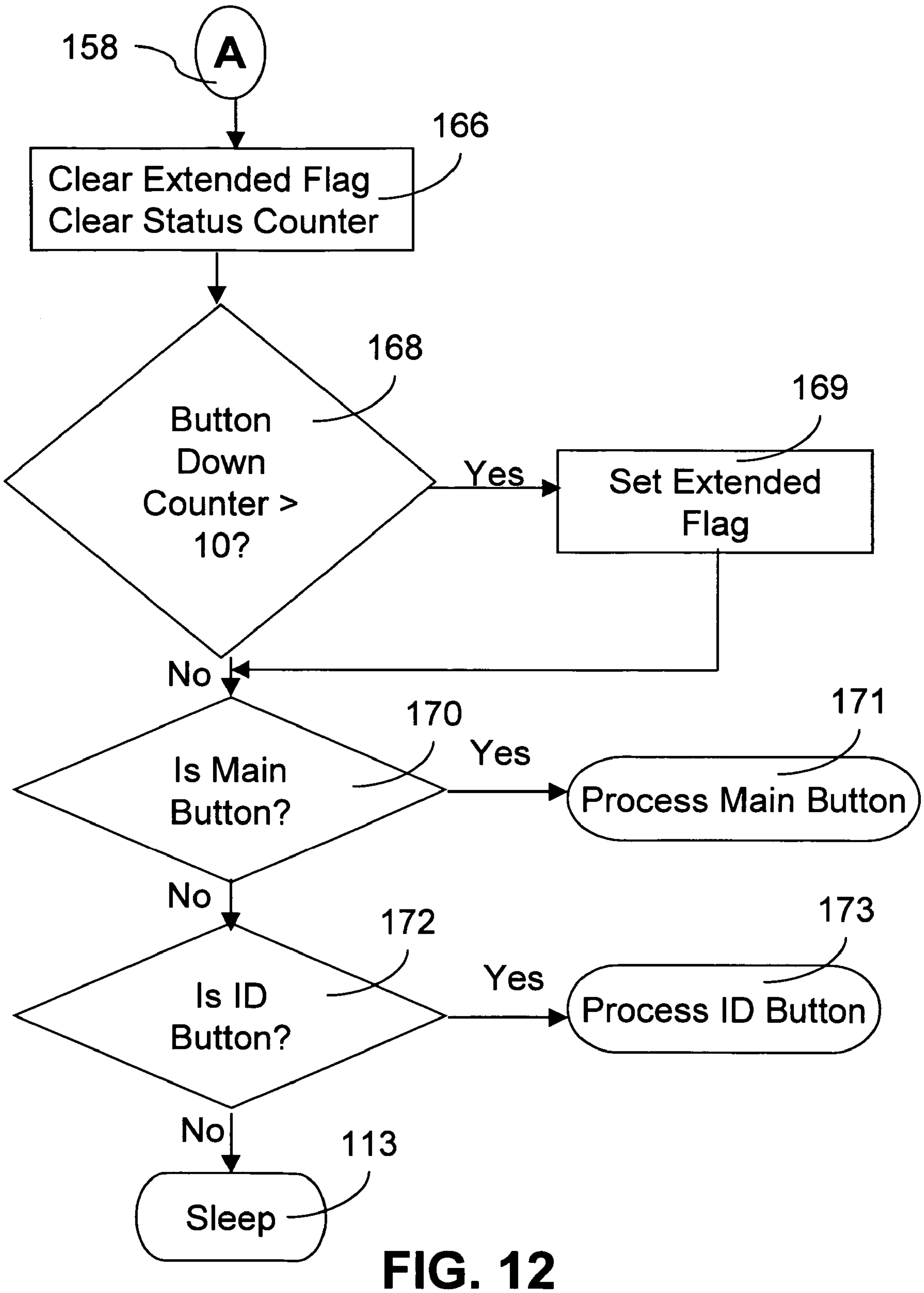
FIG. 12 is a logic flow diagram of a portion of a tracking system, according to an embodiment of the invention.

As shown in FIG. 12, the routine of the Process Button 142 function continues from "A" 158 to a clearing of Extended Flag and Status Counter 166. Then the function proceeds to a check of if the Button Down Counter is greater than ten 168. If the Button Down Counter is greater than ten, a setting of an Extended Flag 169 to "true" is performed. This routine then checks if the Process Button is a Main Button 170. Likewise, if the Button down Counter is not greater than the integer value of ten, the routine proceeds directly to check if the Process Button is a Main Button. If the Process Button is the Main Button, the routine proceed to Process Main Button 171, as detailed in FIG. 13. However, if the Process Button is not the Main Button, the routine proceed check if it is an ID Button 172. If the Process Button is the ID Button, the routine proceeds to Process ID Button 173, as detailed in FIG. 14. However, if the Process Button is not the ID Button, the routine now enters the Sleep 113 mode.

Figure 13:
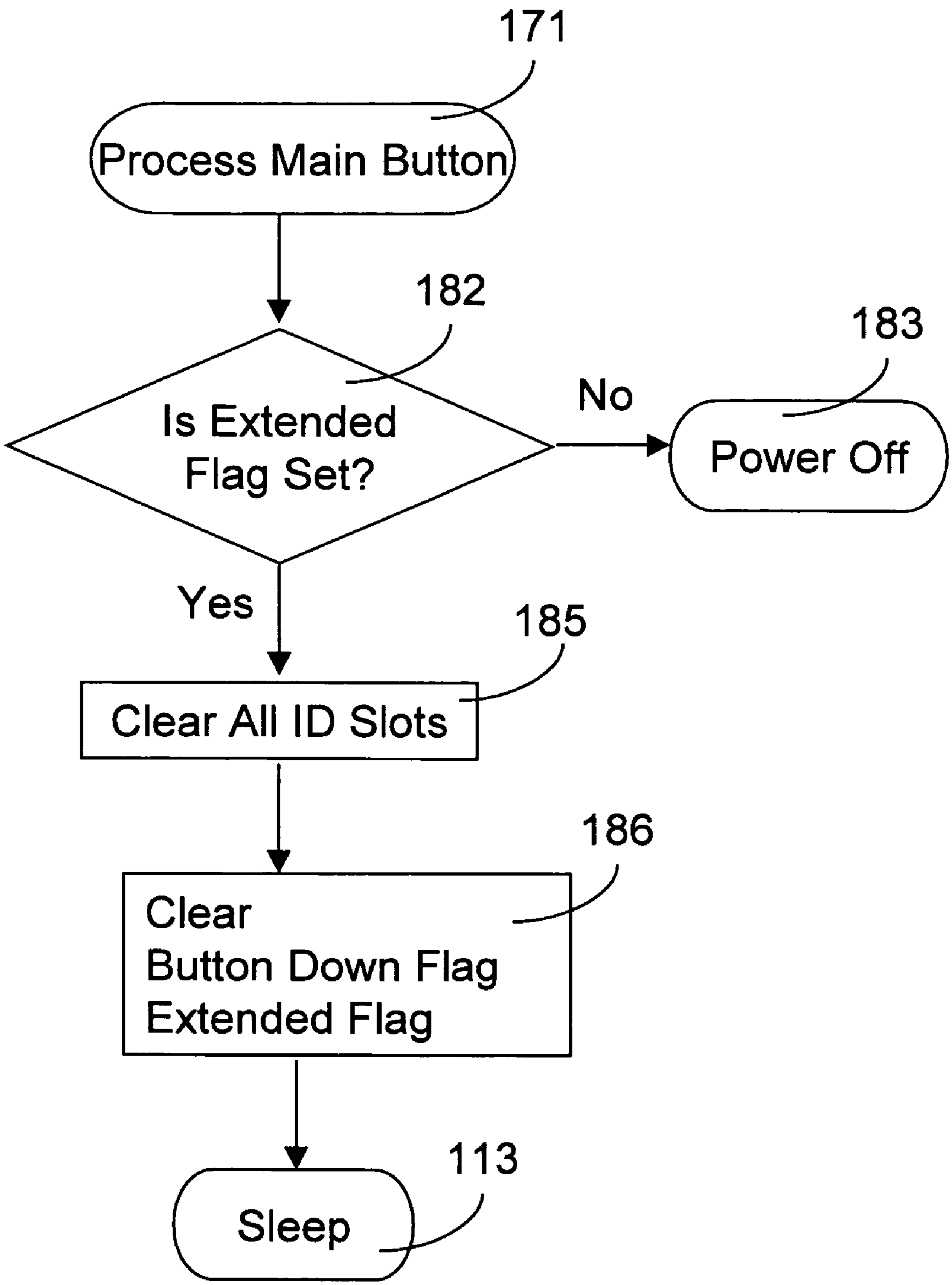
FIG. 13 is a logic flow diagram of a portion of a tracking system, according to an embodiment of the invention.

As shown in FIG. 13, processing the Main Button 171 includes a check of if the Extended Flag is set 182. If the Extended Flag is not set, a power off 183 is performed and the timing and control logic module 56 of the reminder 31 shuts down until the Power On 91 is again pressed. Otherwise, if the Extended Flag is set, then a clearing of all ID Slots 185 is performed. This step is followed by a clearing of the Button Down Flag and the Extended Flag 186, which are both preferably set to the "false" state. After this clearing of the slots and flags, the routine enters the Sleep 113 mode.

Figure 14:
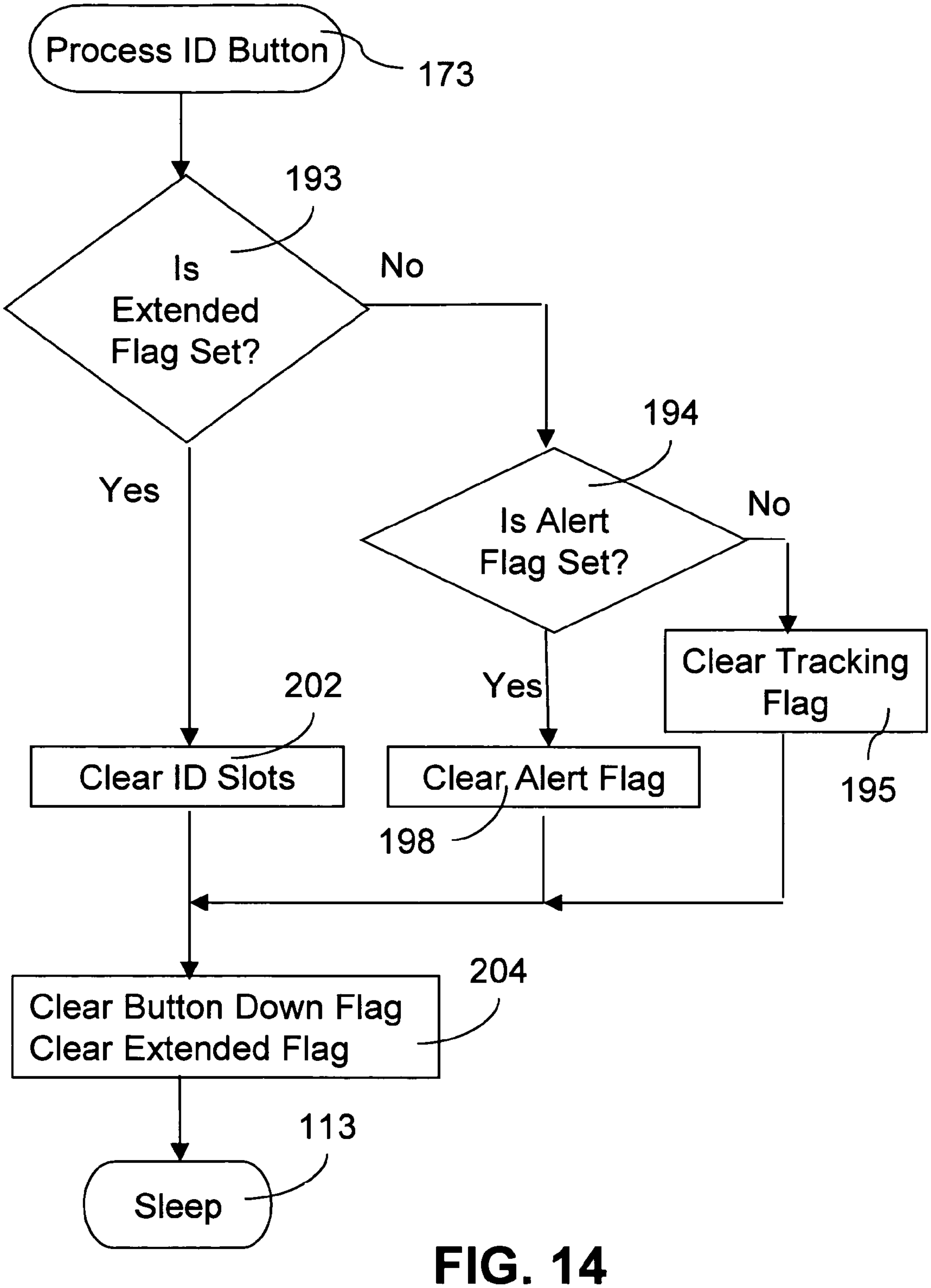
FIG. 14 is a logic flow diagram of a portion of a tracking system, according to an embodiment of the invention.

As shown in FIG. 14, processing the ID Button 173 includes a check on if the Extended Flag is set 193. If the Extended Flag is not set, a check is performed on whether an Alert Flag is set 194. If the Alert Flag is not set, a clearing of a Tracking Flag 195 is performed. Otherwise, if the Alert Flag is set, a clearing of the Alert Flag is 198 performed. If the Extended Flag is set, a clearing of the ID Slots 202 is performed. After either the clearing of the ID Slots, the clearing of the Alert flag, or the clearing of the Tracking Flag, as discussed above, a clearing of the Button Down Flag and a clearing of the Extended Flag 204 is performed. This final clearing step for the processing of the ID Button routine is followed by entry back into the Sleep 113 mode.

Figure 15:
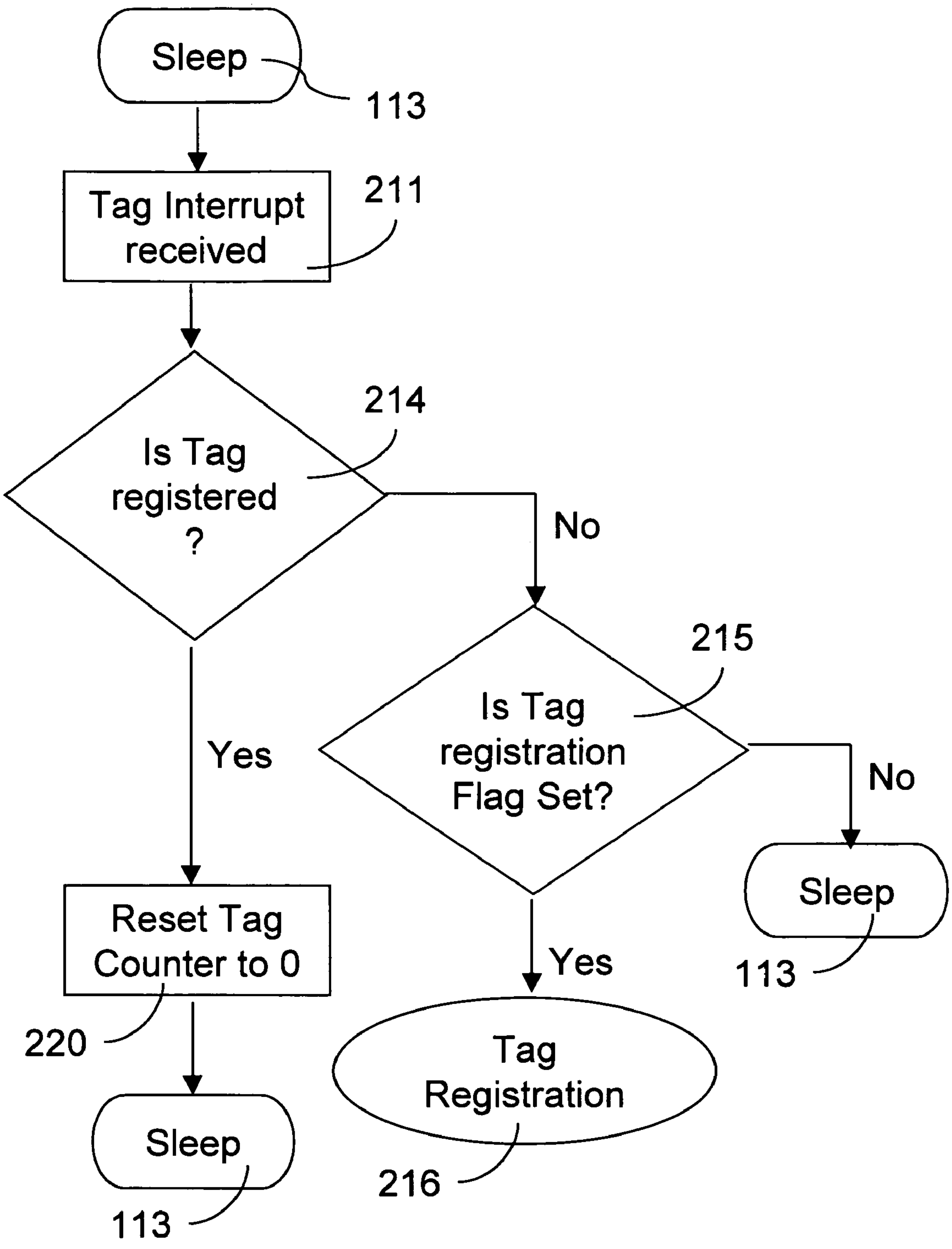
FIG. 15 is a logic flow diagram of a portion of a tracking system, according to an embodiment of the invention.
Figure 16:
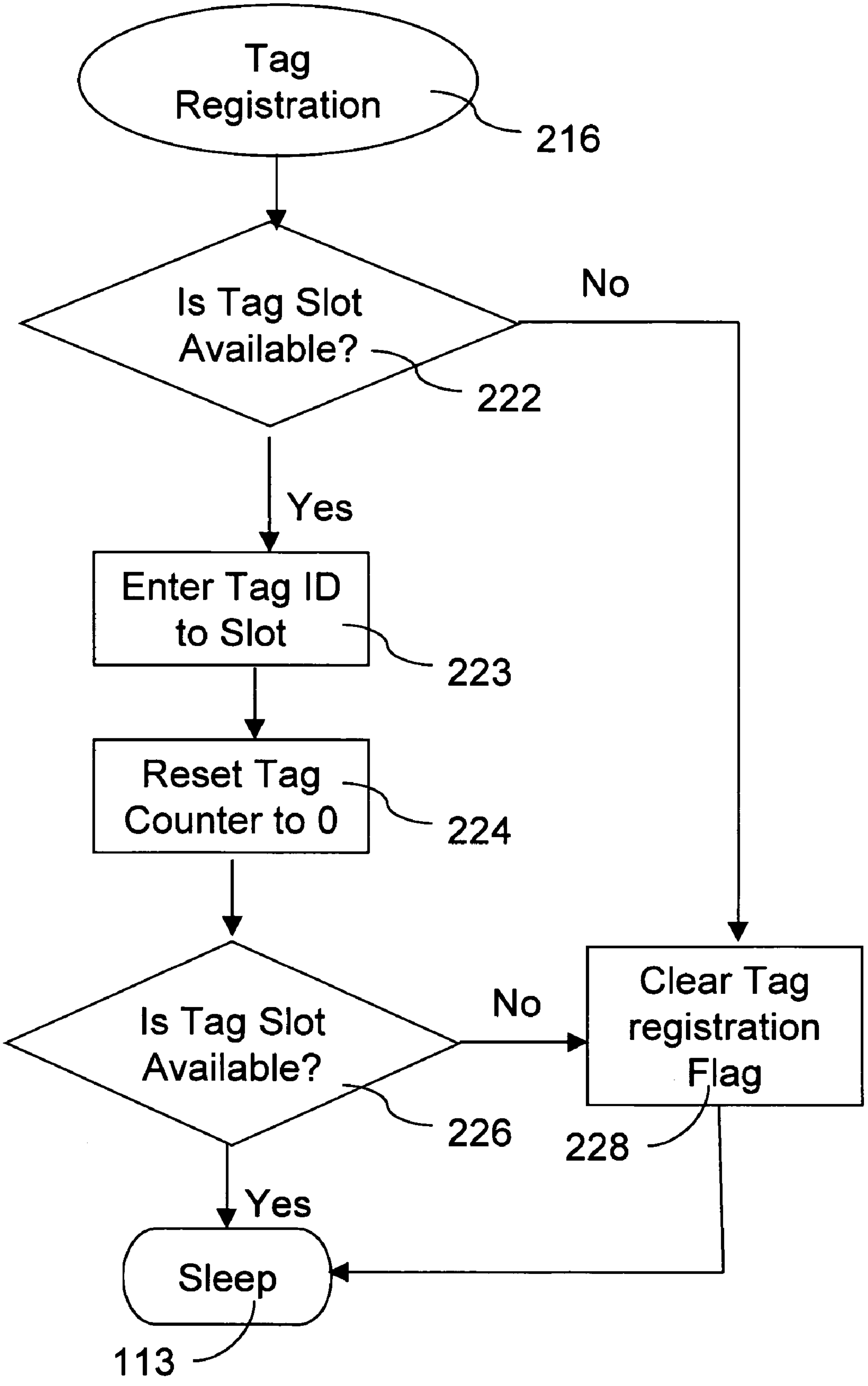
FIG. 16 is a logic flow diagram of a portion of a tracking system, according to an embodiment of the invention.

The Sleep 113 mode is detailed in FIG. 15. Sleep is a default routine that includes waiting for an "interrupt" from a "tag" or radio transmitter 32, as previously discussed herein. Upon a Tag Interrupt received 211, a check is performed to establish if the Tag is registered, with a "is Tag registered" 214 check, with that pre-selected, particular radio frequency receiver 31 or "reminder." If the Tag is not registered, then a check is performed to see if a Tag Registration Flag is set, with an "is Tag Registration Flag set" 215. Then, if no Tag registration Flag is set, the routine re-enters the Sleep 113 mode and awaits receipt of another interrupt. However, if the Tag Registration is set, a Tag registration 216 routine is performed, as shown in FIG. 16. On the other hand, if the "is Tag registered" check returns that the Tag is registered, the Tag Counter is reset to zero 220. This step is then followed by re-entry to the Sleep 113 mode.

As shown in FIG. 16, the Tag registration 216 routine includes a check on "is a Tag Slot Available" 222. If the Tag Slot is Available, a Tag ID is entered into the Slot 223. This is followed by a resetting of The Tag Counter to zero 224, and then by a check on whether the next Tag Slot is available 226, up to a maximum of the total Tag Slots present in the radio transmitter 32, or Tag. Preferably, up to four Tag Slots are available for registration. If the next Tag Slot is available, the routine re-enters the Sleep 113 mode. Otherwise, if the Tag Slot is not available, either initially or the next Tag Slot checked, a clearing of the Tag registration flag 228 is performed.

Again, the above descriptions of FIGS. 7 though 16 are illustrative of a preferred embodiment of the invention. In compliance with the statutes, the invention has been so described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The invention claimed is:

1. A radio frequency receiving device comprising:

an electronic circuitry including a microprocessor, a memory unit, a button, an LED, a speaker device, and a radio frequency receiver circuitry;

the memory unit comprised of a DRAM, the DRAM for storing an instruction to direct an action of the microprocessor;

the button depressible to manually activate an input circuitry, the input circuitry for sending input signals to the microprocessor;

the microprocessor having an output circuitry;

the LED for displaying an output display signal from the output circuitry;

the electronic circuitry having an internal state, the internal state including a sleep mode, an active mode and an alarm mode;

the radio frequency receiver circuitry for receiving a radio frequency signal from a radio frequency transmitter;

the radio frequency receiver circuitry for sensing and determining if the radio frequency signal has a compatible characteristic of an expected signal;

the radio frequency receiver circuitry for converting the radio frequency signal into a digital form;

the radio frequency receiver circuitry for sending the digital form to the microprocessor a counter maintained by the microprocessor, the counter for tracking a cumulative number of the digital form of the radio frequency signals received by the radio frequency receiver circuitry;

an incremental advancement of the counter by the microprocessor;

a check by the microprocessor of the counter to determine if the counter is above an upper count limit of the counter, the upper count limit fixed and pre-determined for the radio frequency receiving device; and the alarm mode entered into by the microprocessor, if the microprocessor determines in the check of the counter that the counter above the upper count limit.

2. The radio frequency receiving device of claim 1, wherein:

the microprocessor is wake-able from the sleep mode after a fixed, pre-determined period of time, to check the input circuitry and so determine if a reset button has been depressed, the microprocessor able to zero the counter and store into the DRAM; and the microprocessor returnable into the sleep mode.

3. The radio frequency receiving device of claim 1, wherein:

said counter is a multiple of counters and said radio frequency transmitter tracked by the microprocessor is a multiple of radio frequency transmitters, and the incremental advancement of each counter by said microprocessor is individually maintained for each of the multiple of radio frequency transmitters.

4. The radio frequency receiving device of claim 3, wherein:

the check by the microprocessor of the counter for each of the multiple of radio frequency transmitters that it keeps track to determine if any of the multiple of counters is above the upper count limit of the counter, the upper count limit fixed and pre-determined for the radio frequency receiving device.

5. The radio frequency receiving device of claim 4, wherein:

the alarm mode is entered into by the microprocessor if the microprocessor determines in the check of the counter for each of the tracked multiple of radio frequency transmitters, that the counter of one of the tracked multiple of radio frequency transmitters is above the upper count limit.

6. The radio frequency receiving device of claim 1, wherein:

said microprocessor sends digital data to its output circuitry to turn the LED's on and off based on the internal state of the radio frequency receiving device as determined by the microprocessor.

7. The radio frequency receiving device of claim 1, wherein:

the microprocessor sends a data signal to the speaker to make a sounding alarm to a user of the device if the microprocessor is in the alarm mode.

8. The radio frequency receiving device of claim 1, wherein:

the microprocessor sets the electronic circuitry into the sleep mode immediately after the microprocessor has finished all processing tasks.

9. A method of a radio frequency receiving device comprising the steps of:

a) providing an electronic circuitry, the electronic circuitry including a microprocessor having an output circuitry, a memory unit comprised of a DRAM, a button, an LED, a speaker device, and a radio frequency receiver circuitry;

b) powering the electronic circuitry by a battery, the electronic circuitry having a sleep mode and an active mode;

c) displaying an output display signal from the output circuitry with the LED;

d) manually activating an input circuitry with the button;

e) sending an input signal to the microprocessor with the input circuitry;

f) receiving a radio frequency signal with the radio frequency receiver circuitry;

g) sensing and determining with the radio frequency receiver circuitry if the radio frequency signal has a compatible characteristic of an expected signal;

h) converting the radio frequency signal into a digital form with the radio frequency receiver circuitry;

i) sending the digital form to the microprocessor of the radio frequency receiver circuitry;

j) tracking each of a plurality of radio frequency transmitter devices with a counter, the counter maintained by the microprocessor unit of the radio frequency receiving device;

k) advancing incrementally a counter by the microprocessor;

l) checking with the microprocessor to determine if the counter is above an upper count limit of the counter, the upper count limit fixed and pre-determined for the radio frequency receiving device; and m) entering an alarm state by the microprocessors, if the microprocessor determines in the check of the counter that the counter of one of the plurality of the radio frequency transmitter devices is above the upper count limit.

10. The method of the radio frequency receiving device of claim 9, with the additional steps of:

n) determining an appropriate further action with a series of instructions stored in the DRAM; and o) executing a series of instructions with the microprocessor.

11. The method of the radio frequency receiving device of claim 9, with the additional steps of:

n) waking the microprocessor from the sleep mode after a fixed, pre-determined period of time;

o) checking the input circuitry to determine if the button has been depressed;

p) setting the microprocessor into a setup mode;

q) resetting a microprocessor internal state and the counters of each of the plurality of the radio frequency transmitter devices;

r) storing the data received by the microprocessor from the radio frequency receiver circuitry into the DRAM.

12. The method of the radio frequency receiving device of claim 9, with the additional steps of:

n) sending a digital data from said microprocessor to its output circuitry o) selectively activating or deactivating said LED's, based on an internal state of the radio frequency receiving device as determined by the microprocessor.

13. The method of the radio frequency receiving device of claim 9, with the additional steps of:

n) sending a digital data to the speaker device to activate a sounding alarm.

14. The method of the radio frequency receiving device of claim 9, with the additional steps of:

n) setting the electronic circuitry into the sleep mode immediately after the microprocessor has finished all processing tasks.

* * * * *